(12) United States Patent
Malgorn

(10) Patent No.: US 8,043,504 B2
(45) Date of Patent: Oct. 25, 2011

(54) FILTER CARTRIDGE

(75) Inventor: Gérard Malgorn, Quimper (FR)

(73) Assignee: Cummins Filtration IP, Inc., Minneapolis, MN (US)

( * ) Notice: Subject to any disclaimer, the term of this patent is extended or adjusted under 35 U.S.C. 154(b) by 1001 days.

(21) Appl. No.: 11/855,368

(22) Filed: Sep. 14, 2007

(65) Prior Publication Data

US 2009/0071892 A1    Mar. 19, 2009

(51) Int. Cl.
*B01D 27/14* (2006.01)
*B01D 25/00* (2006.01)
*B01D 27/00* (2006.01)

(52) U.S. Cl. ........ 210/256; 210/315; 210/338; 210/342; 210/450; 210/493.2

(58) Field of Classification Search .............. None
See application file for complete search history.

(56) References Cited

U.S. PATENT DOCUMENTS

| | | | |
|---|---|---|---|
| 3,262,563 A | 7/1966 | Pall | |
| 4,253,954 A * | 3/1981 | Midkiff et al. ............... | 210/315 |
| 4,502,955 A * | 3/1985 | Schaupp ...................... | 210/149 |
| 5,342,511 A * | 8/1994 | Brown et al. ................. | 210/137 |
| 5,984,109 A * | 11/1999 | Kanwar et al. ............... | 210/440 |
| 5,997,739 A * | 12/1999 | Clausen et al. ............... | 210/232 |
| 6,308,836 B1 | 10/2001 | Guichaoua et al. | |
| 2004/0011724 A1 * | 1/2004 | Engelhard et al. ......... | 210/323.2 |

FOREIGN PATENT DOCUMENTS

| | | |
|---|---|---|
| EP | 0635295 | 1/1995 |
| EP | 1 009 512 | 9/2002 |
| FR | 2762230 | 10/1998 |
| WO | 84/04051 | 10/1984 |
| WO | WO 98/47598 | 10/1998 |
| WO | 2007/149497 | 12/2007 |

* cited by examiner

*Primary Examiner* — Nam Nguyen
*Assistant Examiner* — Madeline Gonzalez
(74) *Attorney, Agent, or Firm* — Hamre, Schumann, Mueller & Larson, P.C.

(57) ABSTRACT

A filter cartridge that is designed to accommodate differences in lengths between an outer filter media and an inner filter media by providing a flexible connection between the inner filter media and the outer filter media. In addition, the endplates of the inner filter and the outer filter together define a gasket groove that receives a gasket. Using the endplates of the inner and outer filter media to define the gasket groove eliminates a mold parting line that can lead to fluid leakage.

17 Claims, 5 Drawing Sheets

FILTER CARTRIDGE

FIELD

This disclosure generally pertains to the field of filtration, and more particularly to a filter cartridge.

BACKGROUND

The use of filter cartridges to filter fluids such as air, fuel, oil and other fluids is well known. A filter cartridge can include, among other features, one or more filter media and plates secured to the filter media at opposite ends. In the case of a filter cartridge configured as a filter-in-filter construction, the inner and outer filter media can have different lengths. The different lengths can create difficulties during assembly of the filter cartridge.

In addition, in certain filter cartridge constructions, a gasket groove is formed in a bottom endplate that receives a gasket for sealing with a standpipe around which the filter cartridge is disposed when the cartridge is installed in a filter housing. During molding of the gasket groove, one or more parting lines are formed on the groove by the mold components that are used to form the bottom endplate. The parting line(s) creates a risk of fluid leakage between the gasket and the endplate.

SUMMARY

A filter cartridge is described that is designed to accommodate differences in length between an outer filter media and an inner filter media by providing a flexible connection between the inner filter media and the outer filter media.

In addition, a filter cartridge is described that includes an inner filter and an outer filter, where endplates of the inner filter and the outer filter together define a gasket groove that receives a gasket. Using the endplates of the inner and outer filter to define the gasket groove eliminates a parting line that can lead to fluid leakage.

In one embodiment, a filter cartridge is provided that comprises an outer filter having a central axis and that includes first filter media and an endplate attached to an end of the first filter media. The endplate includes an outer portion that includes a segment attached to the first filter media, an inner portion substantially surrounded by the outer portion and flexibly connected to the outer portion so that the inner portion and the outer portion are flexible relative to one another to permit relative movements therebetween, a central opening, and at least one opening in the endplate between the outer portion and the inner portion. The cartridge also includes an inner filter that includes second filter media with an end connected to the inner portion. In addition, the inner filter is sized to at least partially fit within the outer filter, and the inner filter includes a central axis coaxial to the central axis of the outer filter.

In another embodiment, a filter cartridge is provided comprising an outer filter having a central axis and that includes first filter media and an endplate attached to an end of the first filter media. The cartridge also includes an inner filter that includes second filter media and an endplate attached to an end of the second filter media. The inner filter at least partially fits within the outer filter, and the inner filter includes a central axis coaxial to the central axis of the outer filter. The endplate of the outer filter and the endplate of the inner filter define a gasket groove, and a gasket is disposed in the gasket groove.

DETAILED DESCRIPTION

Figure 1:
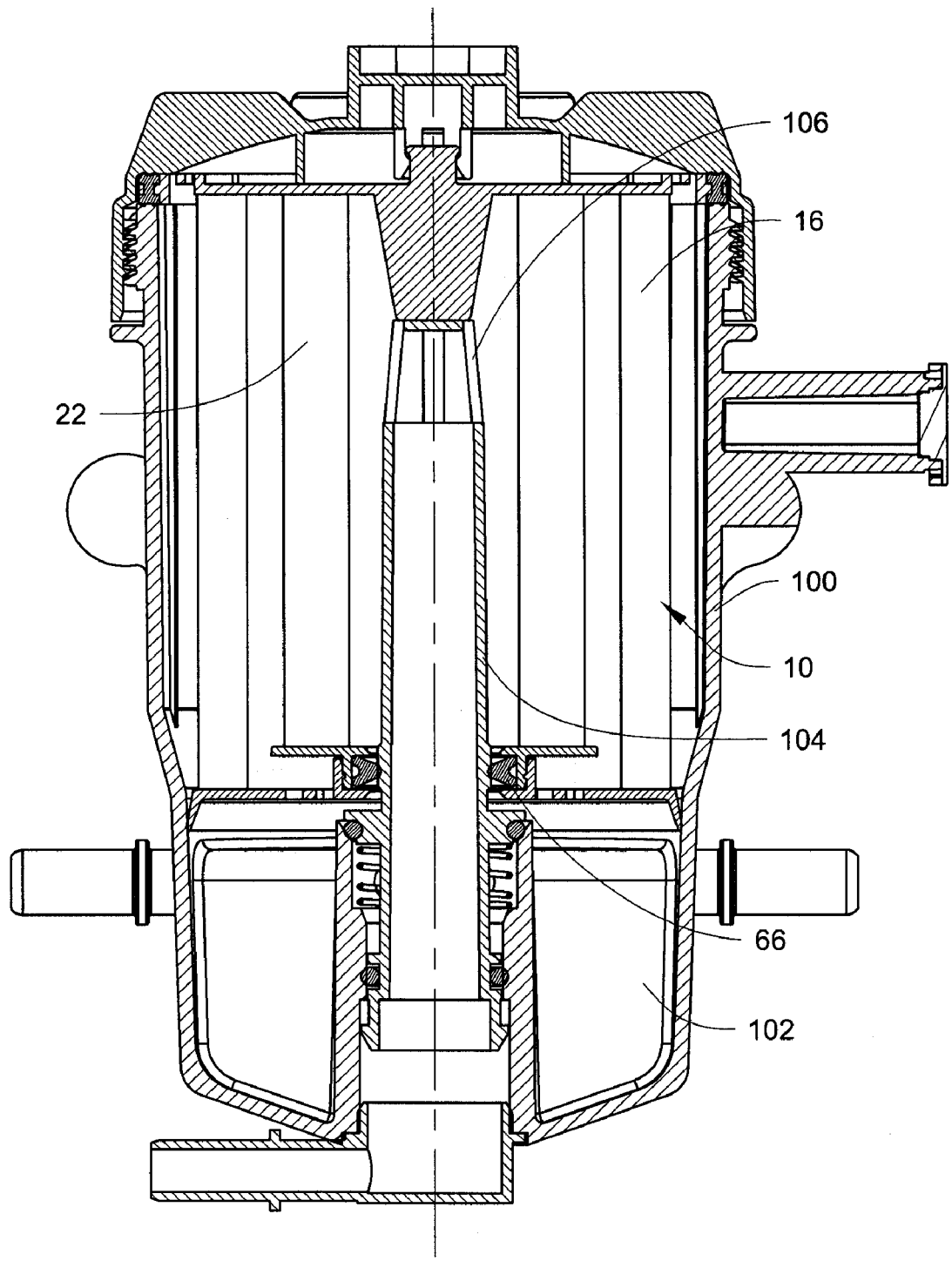
FIG. 1 is a cross-sectional view of a filter cartridge according to one embodiment installed in a filter housing.
Figure 2:
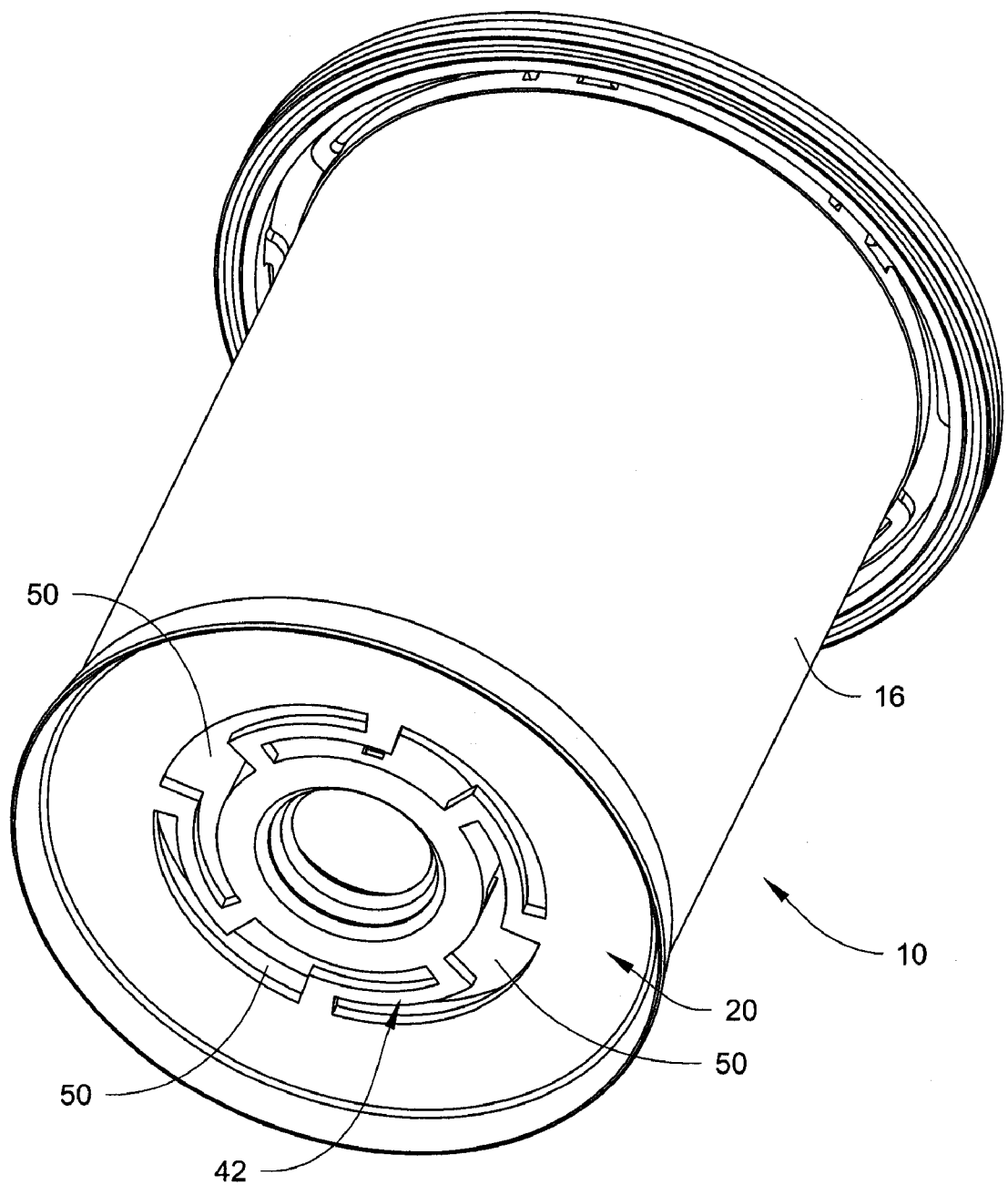
FIG. 2 is a perspective view of the filter cartridge removed from the filter housing.
Figure 3:
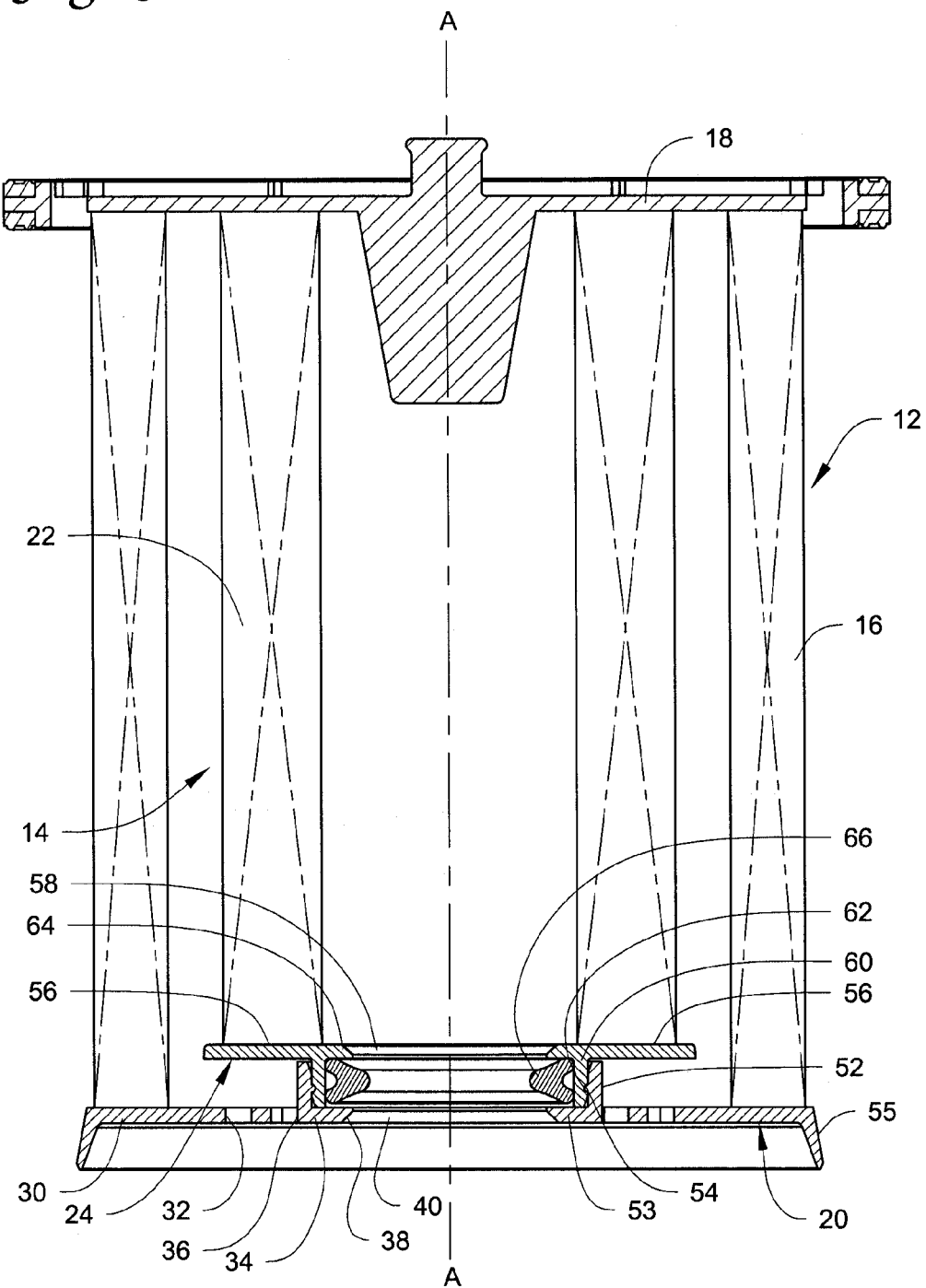
FIG. 3 is a cross-sectional view of the filter cartridge.
Figure 4:
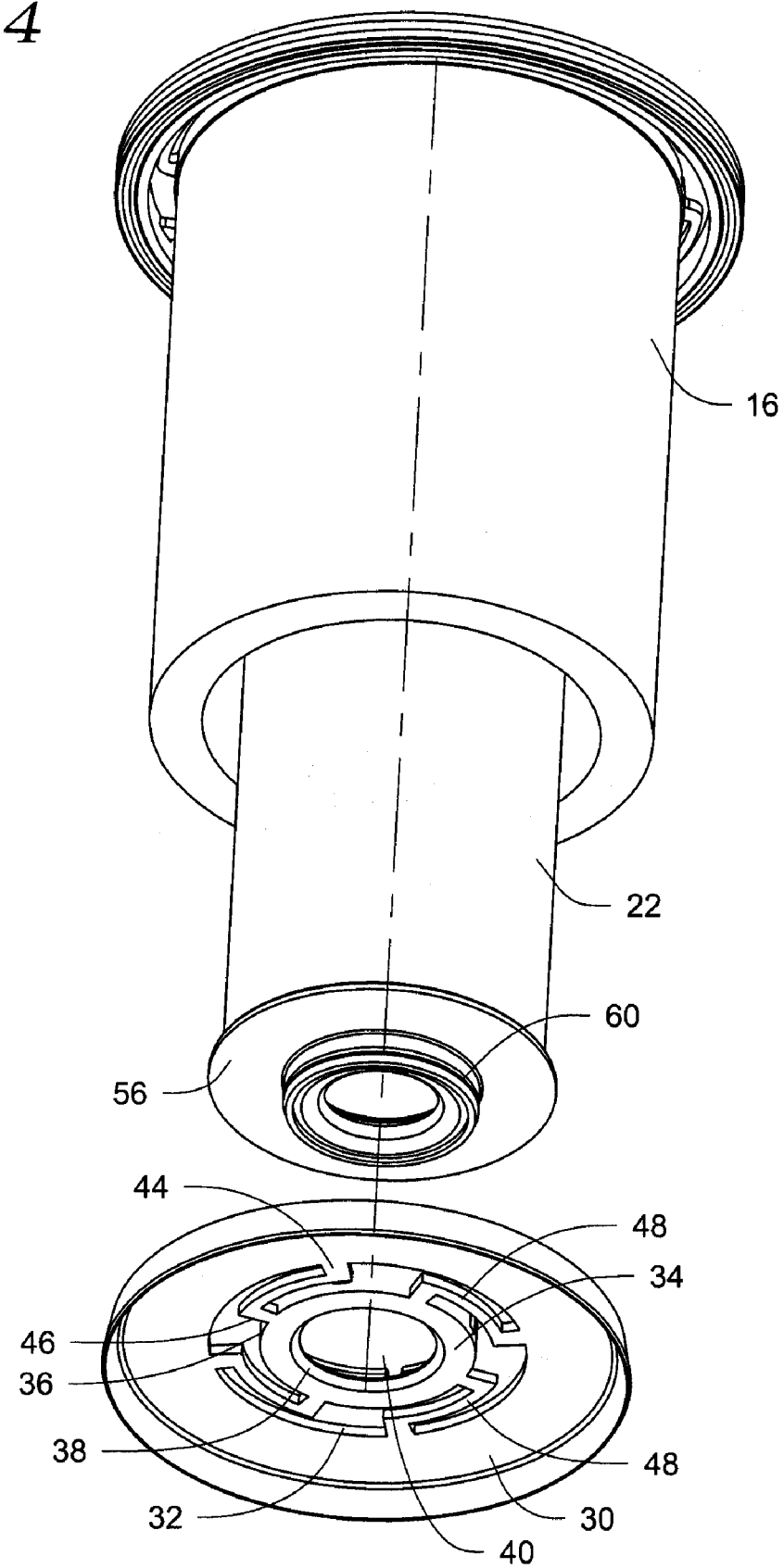
FIG. 4 is a perspective view of the filter cartridge of FIG. 2 in a partially assembled state.
Figure 5:
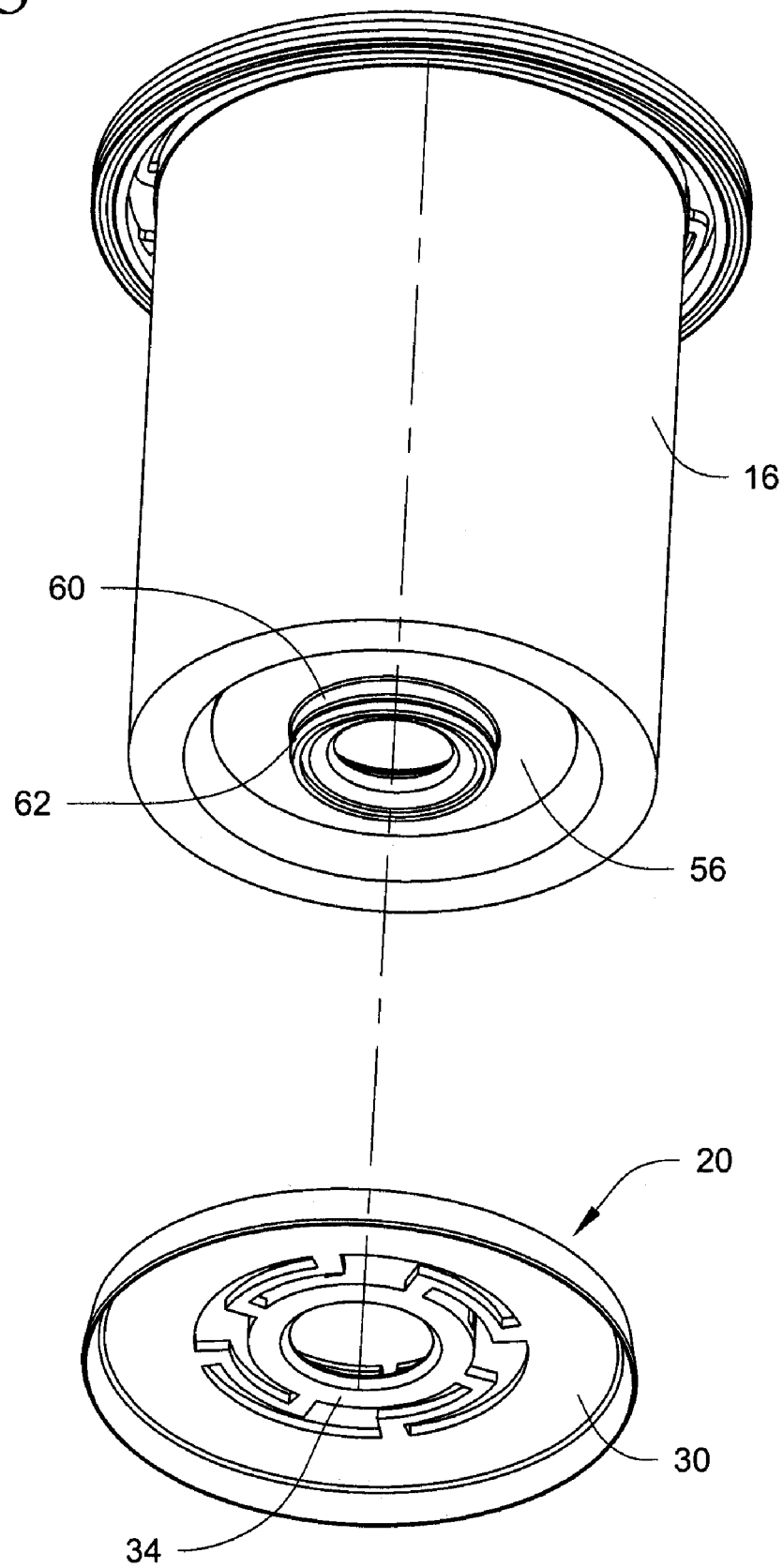
FIG. 5 is a perspective view of the filter cartridge in a more completely assembled state.

With reference to FIGS. 1-3, a filter cartridge 10 according to one embodiment is illustrated. As illustrated, the filter cartridge 10 is designed to be installed in a filter housing 100 for filtering a liquid, for example diesel fuel, and removing water from the liquid. This description will hereinafter describe the liquid as fuel. However, it is to be realized that the concepts described herein can be used for other liquids. In addition, in appropriate circumstances, the concepts described herein can be used to remove contaminants other than water from the liquid. And, in appropriate circumstances, the concepts described herein can be used on filter cartridges that filter other types of fluids, for example air, oil and other fluids.

The filter cartridge 10 is of filter-in-filter construction including an outer filter 12 and an inner filter 14 disposed concentrically inside of the outer filter. The cartridge 10 is designed for outside-in flow, with fuel entering the cartridge from the outside and flows inwardly to the inside of the cartridge.

The outer filter 12 includes a first generally circular filter media 16 disposed around a central axis A-A, an upper endplate 18 attached to an upper end of the media 16, and a bottom endplate 20 attached to a bottom end of the media 16. The inner filter 14 includes a second generally circular filter media 22 disposed around the central axis A-A. An upper end of the media 22 is attached to the upper endplate 18, and a bottom endplate 24 is attached to the bottom end of the media 22 and is attached to the bottom endplate 20.

As shown in FIGS. 2-5, the bottom endplate 20 includes an outer portion 30 that is generally ring-shaped with a first radially-inward facing rim 32. The outer portion 30 that is attached to the media 16 is substantially flat and horizontal. The endplate 20 also includes an inner portion 34 that is substantially surrounded by the outer portion 30. The inner portion 34 is generally ring-shaped and includes a radially-outward facing rim 36 that generally faces the first radially-inward facing rim 32, and a second radially-inward facing rim 38 that defines a central opening 40.

The inner portion 34 is flexibly connected to the outer portion 30 so that the inner portion and the outer portion are flexible relative to one another to permit relative movement therebetween. For example, a plurality of resilient arms 42 are connected between the first radially-inward facing rim 32 and the radially-outward facing rim 36. The arms 42 permit relative movements both axially and radially between the inner portion 34 and the outer portion 30. Each arm 42 includes a first end 44 attached to the first radially-inward facing rim 32 and a second end 46 attached to the radially-outward facing rim 36. The first end 44 is attached to the first radially-inward facing rim at a location that is circumferentially offset from the location of attachment of the second end 46 of the respective arm to the radially-outward facing rim, thereby creating a circumferential link 48 between the ends 44, 46. The space between the arms 42 create water drainage openings 50 between the inner portion 34 and the outer portion 30 to allow water that is separated from the fuel to drain from the filter cartridge 10 into a water collection area 102 of the filter housing 100.

The inner portion 34 also includes an axially extending, generally circular flange 52 that generally extends upwardly from the radially-outward facing rim 36. The flange 52 is spaced from the second radially-inward facing rim 38 to form a ledge 53. In addition, the inner surface of the flange 52 includes a circumferential ridge 54 to connect with the bottom endplate 24.

At the outer peripheral edge of the outer portion 30, a lip 55 extends downwardly therefrom at an angle. In the illustrated embodiment, the lip 55 is generally circular and is integrally formed with the outer portion 30, although the lip could be non-integrally formed. When the filter cartridge 10 is installed, the lip 55 seals with the interior surface of the housing 100 as shown in FIG. 1. Instead of the lip 55, or in addition to the lip 55 if found to be acceptable, a gasket, for example an o-ring or a molded gasket, can be provided for sealing with the interior of the housing 100.

The endplate 24 includes a generally horizontal and substantially flat portion 56 that is attached to the media 22. A central opening 58 is formed in the endplate 24 through which a standpipe 104 of the filter housing 100 extends when the cartridge is installed. The inner rim of the opening 58 is generally aligned with the rim 38. The openings 40 and 58 are illustrated as being generally circular in shape for fitting around a generally circular standpipe. However, the openings 40, 58 could have other shapes as well, for example oval, to fit around, for example, an oval standpipe.

In addition, the endplate 24 includes a segment 60 in the form of an axially extending, generally circular flange. The flange 60 includes a circumferential recess 62 formed on the outer surface thereof that, together with the ridge 54, forms a snap fit connection to connect the flange 60 to the flange 52. As illustrated in FIG. 2, the flange 60 extends downwardly from the portion 56 at a location spaced from the perimeter of the opening 58. Therefore, a ledge 64 is created between the flange 60 and the perimeter of the opening 58. When the flange 60 is connected to the flange 52, the ledges 53 and 64 and the flange 60 define a gasket groove 64 that receives a gasket 66 that seals with the standpipe 104 of the filter housing 100, as shown in FIG. 1, to prevent fluid leakage between the filter cartridge 10 and the standpipe. If desired, the flange 52 can fit inside the flange 60 so that the ledges 53, 64 and the flange 52 define the gasket groove.

In use of the cartridge 10, the cartridge is installed into the filter housing 100 around the standpipe 104. Fuel can include water therein in different forms, including free water, e.g. droplets, and emulsified water. Preferably, the filter media 16 is designed so that free water is initially filtered when fuel enters the filter from the outside. The free water does not penetrate the media 16 and remains substantially outside the filter. The media 16 also coalesces the majority of the emulsified water and separates the now coalesced water from the fuel. Water, being heavier than fuel, settles down to the bottom of the filter cartridge 10, and drains through the openings 50 in the bottom endplate 20 to the water collection area 102. By the time the fuel interfaces with the media 22, most of the water has been separated, and the media 22 performs a final filtration of the fuel before the fuel enters the center of the filter cartridge. The filtered fuel then enters the standpipe 104 through openings 106 therein and flows to an outlet in known manner, leading to a downstream protected component, for example a fuel pump.

The invention may be embodied in other forms without departing from the spirit or novel characteristics thereof. The embodiments disclosed in this application are to be considered in all respects as illustrative and not limitative. The scope of the invention is indicated by the appended claims rather than by the foregoing description; and all changes which come within the meaning and range of equivalency of the claims are intended to be embraced therein.

The invention claimed is:

1. A filter cartridge, comprising:
an outer filter that includes first filter media, and an endplate attached to an end of the first filter media, the outer filter including a central axis;
the endplate includes:
an outer portion that includes a segment attached to the first filter media, and a first ring-shaped portion with a first radially-inward facing rim, the segment attached to the first filter media is substantially flat and horizontal;
an inner portion substantially surrounded by the outer portion, the inner portion includes a second ring-shaped portion disposed within the first ring-shaped portion, the second ring-shaped portion including a radially-outward facing rim that generally faces the first radially-inward facing rim, and a second radially-inward facing rim that defines a central opening;
a connecting portion that flexibly connects the outer portion and the inner portion so that the inner portion and the outer portion are moveable relative to one another to permit relative movements therebetween, the connecting portion includes a plurality of resilient arms connected between the first radially-inward facing rim and the radially-outward facing rim, the arms permitting relative movements between the second ring-shaped portion and the first ring-shaped portion; and
at least one opening in the endplate between the outer portion and the inner portion;
an inner filter that includes second filter media, an end of the second filter media is connected to the inner portion, and the inner filter is sized to at least partially fit within the outer filter, and the inner filter includes a central axis coaxial to the central axis of the outer filter.

2. The filter cartridge of claim 1, wherein the end of the first filter media and the end of the second filter media are bottom ends, and the endplate is a bottom endplate.

3. The filter cartridge of claim 1, wherein the inner filter further includes an endplate attached to the end of the second filter media; the endplate of the inner filter includes a substantially flat, horizontal segment that is attached to the second filter media, and a segment that is attached to the inner portion.

4. The filter cartridge of claim 1, wherein each arm includes a first end attached to the first radially-inward facing rim and a second end attached to the radially-outward facing rim, and the first end of each arm is attached to the first radially-inward facing rim at a location that is circumferentially offset from the location of attachment of the second end of the respective arm to the radially-outward facing rim.

5. The filter cartridge of claim 1, wherein the second ring-shaped portion includes an axially extending, generally circular flange spaced from the second radially-inward facing rim, and the inner filter includes an axially extending, generally circular flange that is fixed to the axially extending, generally circular flange of the second ring-shaped portion.

6. The filter cartridge of claim 3, wherein the endplate of the inner filter and the inner portion define a gasket groove, and further comprising a gasket disposed in the gasket groove.

7. The filter cartridge of claim 1, comprising a plurality of openings in the endplate between the outer portion and the inner portion.

8. A filter cartridge, comprising:
- an outer filter that includes first filter media, an endplate attached to an end of the first filter media, and the outer filter including a central axis, the endplate of the outer filter defining a central opening;
- an inner filter that includes second filter media, an endplate attached to an end of the second filter media, the inner filter at least partially fits within the outer filter, and the inner filter includes a central axis coaxial to the central axis of the outer filter, the endplate of the inner filter includes a central opening;
- the endplate of the outer filter and the endplate of the inner filter define a gasket groove adjacent the central openings; and
- a gasket disposed in the gasket groove, the gasket has a radial inner edge that projects radially inwardly beyond the central openings.

9. The filter cartridge of claim 8, wherein the endplate of the outer filter includes: a first ring-shaped portion with a first radially-inward facing rim, and a segment that is attached to the first filter media and is substantially flat and horizontal;
- a second ring-shaped portion disposed within the first ring-shaped portion, the second ring-shaped portion including a radially-outward facing rim that generally faces the first radially-inward facing rim, and a second radially-inward facing rim that defines a central opening; and
- a plurality of resilient arms connected between the first radially-inward facing rim and the radially-outward facing rim, the arms permitting relative movements between the second ring-shaped portion and the first ring-shaped portion.

10. The filter cartridge of claim 9, wherein the endplate of the inner filter is attached to the second ring-shaped portion.

11. The filter cartridge of claim 8, wherein the end of the first filter media and the end of the second filter media are bottom ends, and the endplates are bottom endplates.

12. The filter cartridge of claim 9, wherein each arm includes a first end attached to the first radially-inward facing rim and a second end attached to the radially-outward facing rim, and the first end of each arm is attached to the first radially-inward facing rim at a location that is circumferentially offset from the location of attachment of the second end of the respective arm to the radially-outward facing rim.

13. A filter cartridge endplate, comprising:
- an outer portion that includes a segment configured for attachment to a first filter, a first ring-shaped portion with a first radially-inward facing rim, the segment is substantially flat and horizontal;
- an inner portion substantially surrounded by the outer portion, the inner portion is configured for attachment to a second filter, the inner portion includes a second ring-shaped portion disposed within the first ring-shaped portion, the second ring-shaped portion including a radially-outward facing rim that generally faces the first radially-inward facing rim, and a second radially-inward facing rim that defines a central opening;
- a connecting portion that flexibly connects the outer portion and the inner portion so that the inner portion and the outer portion are moveable relative to one another to permit relative movements therebetween, the connecting portion includes a plurality of resilient arms connected between the first radially-inward facing rim and the radially-outward facing rim, the arms permitting relative movements between the second ring-shaped portion and the first ring-shaped portion; and
- at least one opening in the endplate between the outer portion and the inner portion.

14. The filter cartridge endplate of claim 13, wherein each arm includes a first end attached to the first radially-inward facing rim and a second end attached to the radially-outward facing rim, and the first end of each arm is attached to the first radially-inward facing rim at a location that is circumferentially offset from the location of attachment of the second end of the respective arm to the radially-outward facing rim.

15. The filter cartridge endplate of claim 13, comprising a plurality of openings in the endplate between the outer portion and the inner portion.

16. The filter cartridge endplate of claim 13, wherein the inner portion includes an axially extending, generally circular flange that extends upwardly toward the second filter.

17. The filter cartridge endplate of claim 16, wherein the outer portion includes a lip adjacent an outer periphery thereof that extends in a direction opposite the flange of the inner portion.

\* \* \* \* \*